US 10,486,622 B2

(12) United States Patent
Kato (10) Patent No.: US 10,486,622 B2
(45) Date of Patent: Nov. 26, 2019

(54) WIRING MEMBER CONNECTION STRUCTURE

(71) Applicant: Yazaki Corporation, Minato-ku, Tokyo (JP)

(72) Inventor: Shingo Kato, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 16/207,979

(22) Filed: Dec. 3, 2018

(65) Prior Publication Data

US 2019/0168694 A1 Jun. 6, 2019

(30) Foreign Application Priority Data

Dec. 6, 2017 (JP) .................................. 2017-234509

(51) Int. Cl.
*B60R 16/02* (2006.01)
*B60K 37/00* (2006.01)
*H01R 13/631* (2006.01)

(52) U.S. Cl.
CPC .......... *B60R 16/0207* (2013.01); *B60K 37/00* (2013.01); *H01R 13/631* (2013.01); *B60K 2370/44* (2019.05); *H01R 2201/26* (2013.01)

(58) Field of Classification Search
CPC ... H01R 4/32; H01R 4/34; H01R 4/30; H01R 9/24; H02G 5/007
USPC .......... 439/213, 709, 801, 810; 174/18, 145, 174/72 R
See application file for complete search history.

(56) References Cited

U.S. PATENT DOCUMENTS

| | | | | | |
|---|---|---|---|---|---|
| 3,419,843 | A | * | 12/1968 | Hays | H01R 4/30 403/388 |
| 5,486,434 | A | * | 1/1996 | Aoyama | H01R 11/283 429/121 |
| 6,333,464 | B1 | * | 12/2001 | Ellison | H01R 4/30 174/138 F |
| 6,902,434 | B2 | * | 6/2005 | Stack | H01H 85/044 337/187 |
| 7,192,319 | B1 | * | 3/2007 | Rahman | H01H 85/044 439/766 |
| 7,438,605 | B1 | * | 10/2008 | Huang | H01R 4/28 174/92 |
| 7,766,673 | B1 | * | 8/2010 | Dumont | H01R 13/68 439/76.2 |

(Continued)

FOREIGN PATENT DOCUMENTS

JP 2001-150979 A 6/2001

*Primary Examiner* — Tulsidas C Patel
*Assistant Examiner* — Marcus E Harcum
(74) *Attorney, Agent, or Firm* — Banner & Witcoff, Ltd.

(57) ABSTRACT

A wiring member connection structure is provided. The wiring member connection structure includes a flat wiring member formed by covering an outer circumference of a belt-like flat conductor with an insulating coating, a bolt that is erect and bonded perpendicularly to one conductor flat surface of the flat conductor exposed at a terminal of the flat wiring member where the coating is removed, a counterpart wiring member in which a through hole is provided at a terminal of a conductor so as to pass the bolt, and a nut that is screwed on the bolt inserted through the through hole to thereby conductively connect the flat conductor of the flat wiring member directly to the conductor of the counterpart wiring member.

4 Claims, 7 Drawing Sheets

(56) References Cited

U.S. PATENT DOCUMENTS

| | | | |
|---|---|---|---|
| 7,955,141 B2* | 6/2011 | Jang | H01R 11/09 |
| | | | 439/709 |
| 9,384,929 B2* | 7/2016 | Masuda | H01H 85/0241 |
| 2009/0002956 A1* | 1/2009 | Suwa | B60L 1/003 |
| | | | 361/728 |
| 2014/0131064 A1* | 5/2014 | Yamada | H01B 13/14 |
| | | | 174/117 F |
| 2016/0134060 A1* | 5/2016 | Hwang | H01R 13/6581 |
| | | | 439/587 |
| 2016/0268579 A1* | 9/2016 | Ichikawa | H01M 2/202 |
| 2019/0165494 A1* | 5/2019 | Sayo | H01R 4/30 |

\* cited by examiner

WIRING MEMBER CONNECTION STRUCTURE

CROSS-REFERENCE TO RELATED APPLICATIONS

This application is based on and claims priority under 35 USC 119 from Japanese Patent Application No. 2017-234509 filed on Dec. 6, 2017, the contents of which are incorporated herein by reference.

TECHNICAL FIELD

The present invention relates to a wiring member connection structure.

BACKGROUND ART

An electric wire connection structure using an electric connection box has been known as an electric wire (wiring member) connection structure making connection between an instrument panel side wire harness and a vehicle body side wire harness routed in a car (see PTL 1). Generally, in the electric wire connection structure using the electric connection box, connector fitting portions are provided at the electric connection box, and connectors at terminals of (branched) electric wires led out of main lines of the wire harnesses are connected to the connector fitting portions. That is, the electric wire of the instrument panel side wire harness and the electric wire of the vehicle body side wire harness are connected to each other through the connectors.

CITATION LIST

Patent Literature

PTL 1: JP-A-2001-150979

SUMMARY OF INVENTION

However, the electric wire connection structure using the connector connection requires components such as insulating housings and male and female terminals. Therefore, the size of the connector increases to make it necessary to secure a larger mounting space on a vehicle. In addition, in the electric wire connection structure using the connectors, retention of the terminals or fitting lock of the insulating housings is attained by a lock structure so that connection strength is not high. Therefore, when strong force is applied to the connection portions due to a vehicle accident etc., there is a possibility of disconnection.

The present invention has been accomplished in consideration of the aforementioned situation. An object of the present invention is to provide a wiring member connection structure, that can be mounted on a vehicle in a smaller space and can be configured with higher conductive connection strength than a connector connection structure.

The foregoing object of the present invention can be achieved by the following configurations.

(1) A wiring member connection structure includes a flat wiring member formed by covering an outer circumference of a belt-like flat conductor with an insulating coating; a bolt that is erect and bonded perpendicularly to one conductor flat surface of the flat conductor exposed at a terminal of the flat wiring member where the coating is removed; a counterpart wiring member in which a through hole is provided at a terminal of a conductor so as to pass the bolt, and a nut that is screwed on the bolt inserted through the through hole to thereby conductively connect the flat conductor of the flat wiring member directly to the conductor of the counterpart wiring member.

According to the wiring member connection structure having the aforementioned configuration (1), the flat wiring members are conductively connected to the counterpart wiring members. The bolts are erect and bonded to the one conductor flat surfaces of the flat conductors exposed at the terminals of the flat wiring members where the coatings have been removed. That is, the flat wiring members serve as bolt-including wiring members in which the bolts have been conductively fixed to the terminals. On the other hand, the through holes are provided in the conductors at the terminals of the counterpart wiring members to be connected to the flat wiring members. When, for example, the counterpart wiring members are flat wiring members, the through holes can be directly bored in flat conductors. When, for example, the counterpart wiring members are round electric wires, the through holes are provided as through holes formed in terminal pieces which are connected to the conductors at the terminals of the counterpart wiring members. In the flat wiring members and the counterpart wiring members configured in this manner, the bolts bonded to the conductor flat surfaces of the flat conductors are inserted through the through holes provided in the conductors at the terminals of the counterpart wiring members and fastened to the nuts. Thus, the conductors in the flat wiring members and the counterpart wiring members are conductively connected directly to each other respectively. As a result, the wiring member connection structure according to the present configuration does not require any connector or any electric connection box but can suppress a mounting space on a vehicle. In addition, due to the conductors directly fixed to each other by the bolts and the nuts, the wiring member connection structure according to the present configuration can obtain connection with higher strength than a connector connection structure.

(2) The wiring member connection structure according to the aforementioned configuration (1), a plurality of the flat wiring members are laminated in layers. Further, the respective terminals of the flat wiring members laminated to one another are disposed in parallel on substantially one and the same plane.

According to the wiring member connection structure having the aforementioned configuration (2), even in the case of the laminated wiring body in which the flat wiring members are laminated to one another, the respective flat wiring members are arranged side by side on substantially one and the same plane at the terminal of the laminated wiring body. Accordingly, connection work for fastening bolts to nuts can be made easy.

(3) The wiring member connection structure having the aforementioned configuration (1) or (2), wherein the terminal of the flat wiring member and the terminal of the counterpart wiring member fastened to each other respectively by the bolt and the nut are covered with a casing and a cover assembled to the casing.

According to the wiring member connection structure having the aforementioned configuration (3), the terminals of the flat wiring members and the terminals of the counterpart wiring members from which the coatings have been removed and which have been fastened to each other respectively by the bolts are covered with the casing and the cover. Therefore, for example, conductor connection portions between the flat wiring members and the counterpart wiring members can be electrically insulated in a lump. In addition, when, for example, fixation portions to a body panel etc. are provided in the casing, wiring member connection portions can be directly fixed to the body panel etc. Thus, electric insulation and fixation of the wiring member connection portions can be performed simultaneously so that assembling workability can be enhanced.

(4) The wiring member connection structure according to the aforementioned configuration (3), wherein in a case that the wiring member connection structure has a configuration in which the terminals are disposed in parallel, a partition wall for preventing short-circuiting between the terminals adjacent to each other is formed in at least one of the casing and the cover.

According to the wiring member connection structure having the aforementioned configuration (4), short-circuiting between the conductors of the flat wiring members and the conductors of the counterpart wiring members arranged side by side on substantially one and the same plane inside the casing and the cover can be prevented by the partition wall formed in at least one of the casing and the cover. Accordingly, it is not necessary to apply insulating treatment to adjacent ones of the conductor connection portions respectively but short-circuiting can be prevented simultaneously by easy work of only assembling the conductor connection portions into the casing and the cover.

(5) The wiring member connection structure according to the aforementioned configuration (4), wherein a plurality of the terminals of the counterpart wiring members are lined up by a guide member in accordance with the respective terminals of the flat wiring members disposed in parallel.

According to the wiring member connection structure having the aforementioned configuration (5), the counterpart wiring members lined up integrally by the guide member can be assembled in a lump, for example, into the casing in which the flat wiring members have been assembled. The counterpart wiring members are mounted on the guide member respectively to be thereby positioned relatively to one another. That is, since the counterpart wiring members are mounted on the guide member, all the counterpart wiring members are positioned in accordance with attachment positions (attachment intervals) of the flat wiring members and preassembled. Accordingly, in the wiring member connection structure according to the present configuration, the through holes provided at the terminals of the counterpart wiring members preassembled by the guide member are penetrated in a lump by the bolts provided on the respective terminals of the flat wiring members.

According to the wiring member connection structure according to the present invention, it can be mounted on a vehicle in a smaller space and can be configured with higher conductive connection strength than a connector connection structure.

The present invention has been described above briefly. Further, when a mode (hereinafter referred to as "embodiment") for carrying out an under mentioned invention is read through with reference to the accompanying drawings, details of the present invention can be made clearer.

BRIEF DESCRIPTION OF DRAWINGS

Exemplary embodiment(s) of the present invention will be described in detail based on the following figures.

DESCRIPTION OF EMBODIMENTS

An embodiment according to the present invention will be described below with reference to the drawings.

A wiring member connection structure according to the present embodiment provides a structure in which an instrument panel wire harness and a floor wire harness are connected to each other compactly with high reliability in a backbone wire harness that will be expected as a future wire harness routing form (in a form in which a power supply distribution box is connected to an intermediate portion of a battery cable, and power is distributed from the power supply distribution box).

Figure 1:
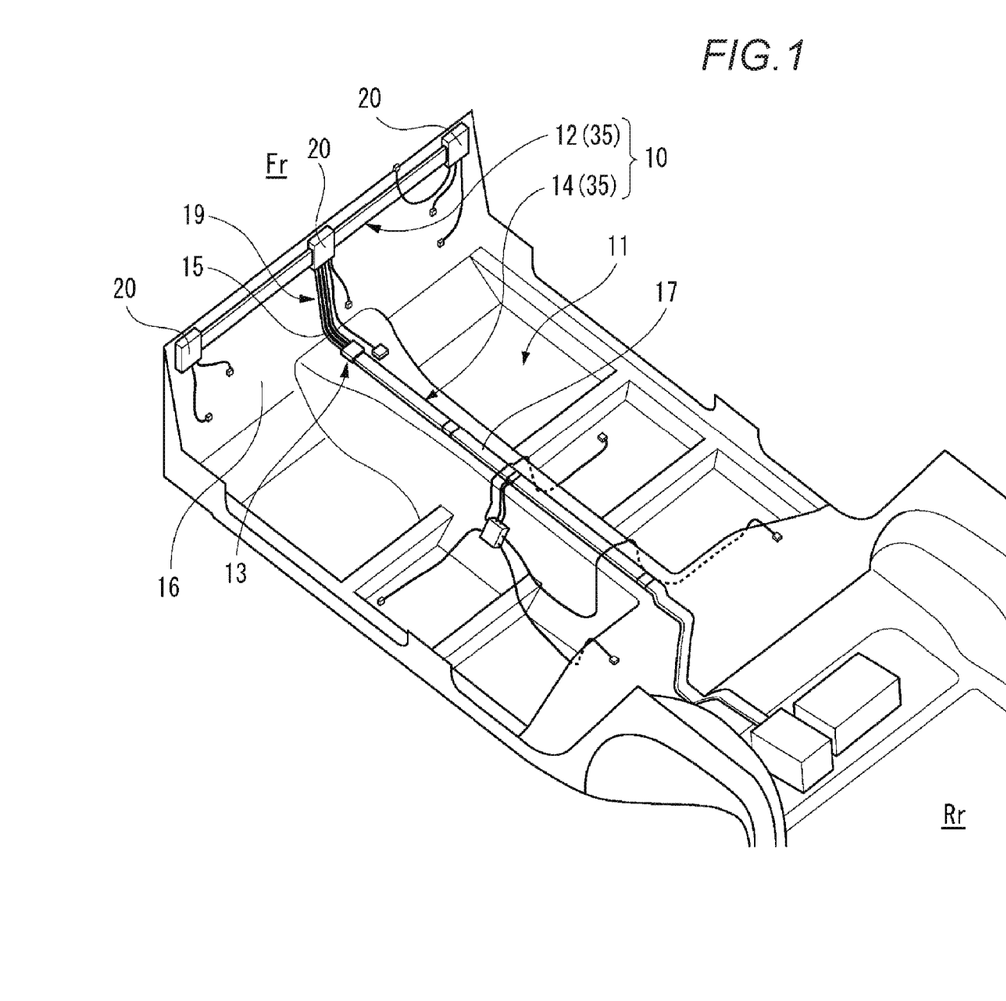
FIG. 1 is a perspective view showing an underbody of a vehicle mounted with wiring members connected by a wiring member connection structure according to an embodiment of the present invention.

FIG. 1 is a perspective view showing an underbody 11 of a vehicle mounted with a vehicle circuit body 10 connected by the wiring member connection structure according to the embodiment of the present invention. In the underbody 11 serving as a body panel, a front of the vehicle is denoted as Fr, and a rear of the vehicle is denoted as Rr in accordance with a direction viewed from a driver.

As shown in FIG. 1, the vehicle circuit body 10 according to the present embodiment is provided with a floor wire harness 14, an instrument panel wire harness 12, and a plurality of control boxes 20 as basic constituent members. The floor wire harness 14 is routed in the underbody 11. The instrument panel wire harness 12 is routed in a dash panel 16. The control boxes 20 are disposed decentrally along the harnesses.

The instrument panel wire harness 12 is disposed linearly in a left/right direction at a place extending along a face of the dash panel 16 so as to be substantially parallel with a not-shown reinforcement at a position above the reinforcement. Incidentally, the instrument panel wire harness 12 may be fixed to the reinforcement.

In addition, the floor wire harness 14 is disposed on a substantially laterally central portion of a vehicle body along the underbody 11 so as to extend in a front/rear direction of the vehicle body. Counterpart wiring members 19 that are rising portions connected to a front end portion of the floor wire harness 14 to rise along the face of the dash panel 16 extend linearly in an up/down direction and have front ends connected to one of the control boxes 20 at an intermediate portion of the instrument panel wire harness 12. That is, the vehicle circuit body 10 is constituted by the instrument panel wire harness 12 and the floor wire harness 14 to be formed into a shape similar to a T-shape.

The wiring member connection structure according to the present embodiment is applied to a wiring member connection portion 13 between the counterpart wiring members 19 and the front end portion of the floor wire harness 14. The counterpart wiring members 19 are connected to the front end portion of the floor wire harness 14 to rise along the dash panel 16 in order to connect the instrument panel wire harness 12 and the floor wire harness 14 to each other in the vehicle circuit body 10.

In the present embodiment, belt-like flat wiring members 17 are used as each of the instrument panel wire harness 12 routed in the dash panel 16 and the floor wire harness 14 routed in the underbody 11. On the other hand, round electric wires 15 are used as the counterpart wiring members 19 connected to the front end portion of the floor wire harness 14.

Incidentally, the wiring member connection structure according to the present embodiment is not limited to connection between the round electric wires 15 and the flat wiring members 17. The wiring member connection structure according to the present embodiment may apply connection between the flat wiring members 17 and other flat wiring members 17, as will be described later. That is, it is essential that at least one pair of the wiring members to be connected are the flat wiring members 17. In the wiring member connection portion 13 according to the present embodiment, the counterpart wiring members 19 on a side connected to the flat wiring members 17 of the floor wire harness 14 are the round electric wire 15.

In addition, each of the wiring members to be connected to each other may consist of one piece or may consist of a plurality of pieces. A case where two flat wiring members 17 and two counterpart wiring members 19 are used in the wiring member connection portion 13 provided with the wiring member connection structure according to the present embodiment will be described. However, the number of the flat wiring members 17 and the number of the counterpart wiring members 19 are not limited to two.

Figure 2:
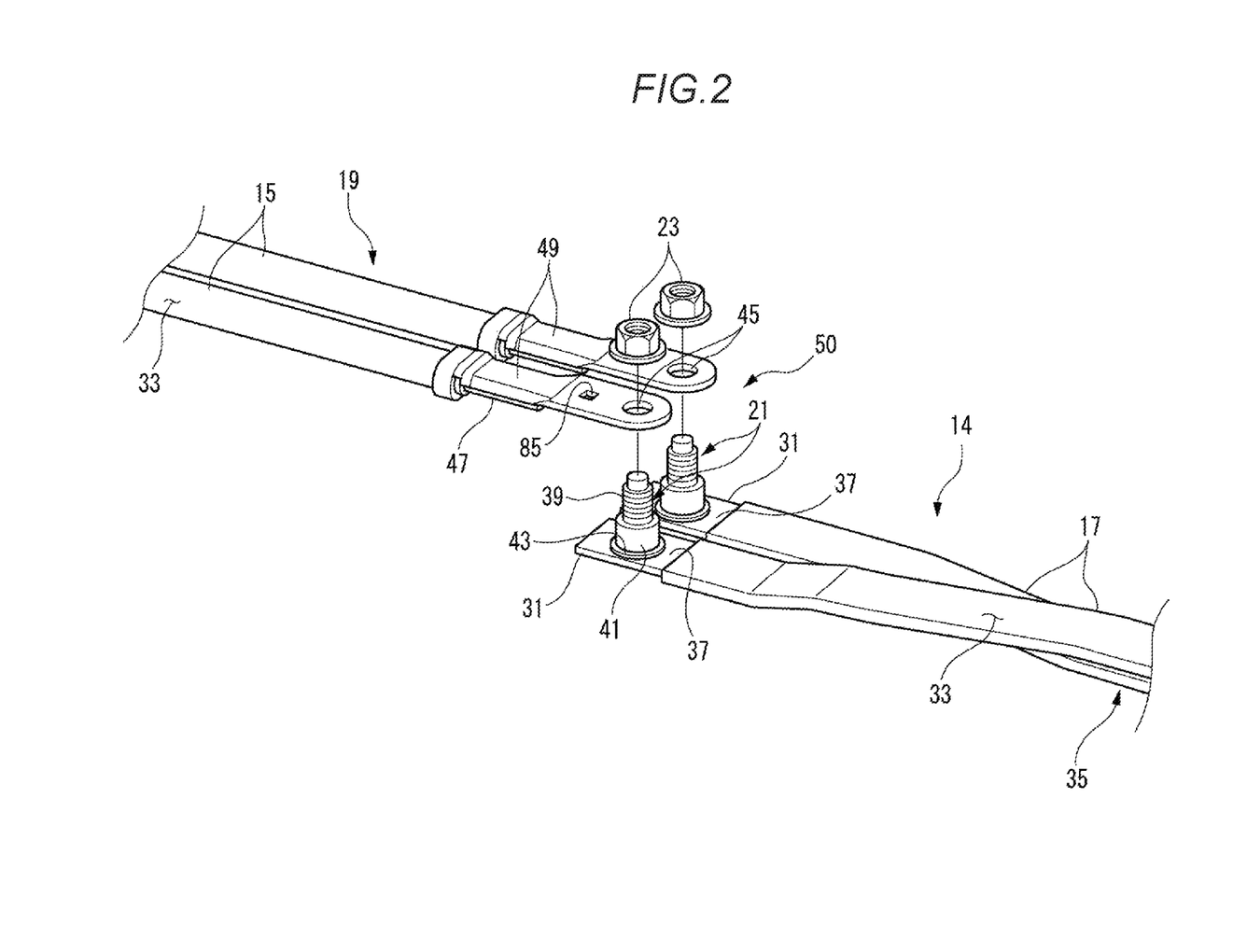
FIG. 2 is an exploded perspective view showing a main part in the wiring member connection structure shown in FIG. 1.

FIG. 2 is an exploded perspective view showing a main part in the wiring member connection structure shown in FIG. 1.

The wiring member connection portion 13 provided with the wiring member connection structure according to the present embodiment has the flat wiring members 17, bolts 21, the counterpart wiring members 19, and nuts 23 as essential constituents.

In addition to the aforementioned essential constituents, the wiring member connection portion 13 according to the present embodiment also has a casing 25, a cover 27, and a guide member 29 as other main constituents.

Each of the flat wiring members 17 according to the present embodiment is formed in such a manner that an outer circumference of a flat conductor 31 is covered with an insulating coating 33. The flat conductor 31 is made of a belt-like electrically conductive metal material (e.g. a copper alloy, an aluminum alloy, etc.) whose sectional shape is flat. The coating 33, for example, made of an insulating resin material is provided on the outer circumference side of the flat conductor 31 so as to cover the entire circumference thereof. The coating 33 covering the flat conductor 31 is formed, for example, by extrusion molding, lamination molding, powder coating, etc. The powder coating may be any of "electrostatic coating (air spray coating)" and "fluidizing coating (dip coating)".

The flat wiring members 17 can be laminated in layers. In the present embodiment, the number of the layers of the flat wiring members 17 are two. Further, the number of the layers of the flat wiring members 17 may be one, or may be three or more. The flat wiring members 17 laminated on each other constitute a laminated wiring body 35.

The bolts 21 are erect and bonded perpendicularly to one conductor flat surfaces 37 of the flat conductors 31. The conductor flat surfaces 37 are exposed at terminals of the flat wiring members 17 where the coatings 33 have been removed. The bolts 21 are bonded to the conductor flat surfaces 37, for example, by ultrasonic joining, friction stir welding, etc. Each of base portions of the bolts 21 is a circular cylinder portion 41 larger in diameter than an external thread portion 39. The circular cylinder portion 41 has a flange portion 43 provided on its opposite end portion to the external thread portion 39. The flange portion 43 is larger in diameter than the circular cylinder portion 41. Since the flange portion 43 of the bolt 21 has a surface to be bonded to the conductor flat surface 37, the bolt 21 secures a large bonding area. Incidentally, the bolt 21 may penetrate a through hole formed in the conductor flat surface 37 to be bonded and fixed to the conductor flat surface 37. However, it is desirable that the bolt 21 is bonded to the conductor flat surface 37 in order to secure electric conductivity.

The counterpart wiring members 19 serving as the rising portions connected to the front end portion of the floor wire harness 14 are provided to be equivalent in number to the flat wiring members 17 of the floor wire harness 14. In the present embodiment, the number of the counterpart wiring members 19 is two equivalently to the flat wiring members 17 laminated in two layers. A through hole 45 through which the bolt 21 is inserted is provided at a terminal of a conductor 47 in each of the counterpart wiring members 19. The counterpart wiring member 19 can be, for example, used as the round electric wire 15. The round electric wire 15 is formed in such a manner that an outer circumference of the conductor 47 (core) is covered with an electrically insulating coating 33. Other than the single wire, the core of the round electric wire 15 can consist of a plurality of parallel wires or twisted wires. The counterpart wiring member 19 can be provided with a through hole 45 at the terminal of the conductor 47 in a form in which, for example, a terminal piece 49 (a bolt fastening terminal piece such as an LA terminal piece) having the through hole 45 is crimped on the terminal of the conductor 47 to be electrically connected thereto.

The nuts 23 are screwed on the bolts 21 that have been inserted through the through holes 45 of the terminal pieces 49. Since the nuts 23 are screwed on the bolts 21, the flat conductors 31 of the flat wiring members 17 are conductively connected directly to the terminal pieces 49 of the counterpart wiring members 19. Incidentally, it is preferable that the nuts 23 are used as flange-including hexagonal nuts whose contact areas with the terminal pieces 49 can be increased.

Figure 3:
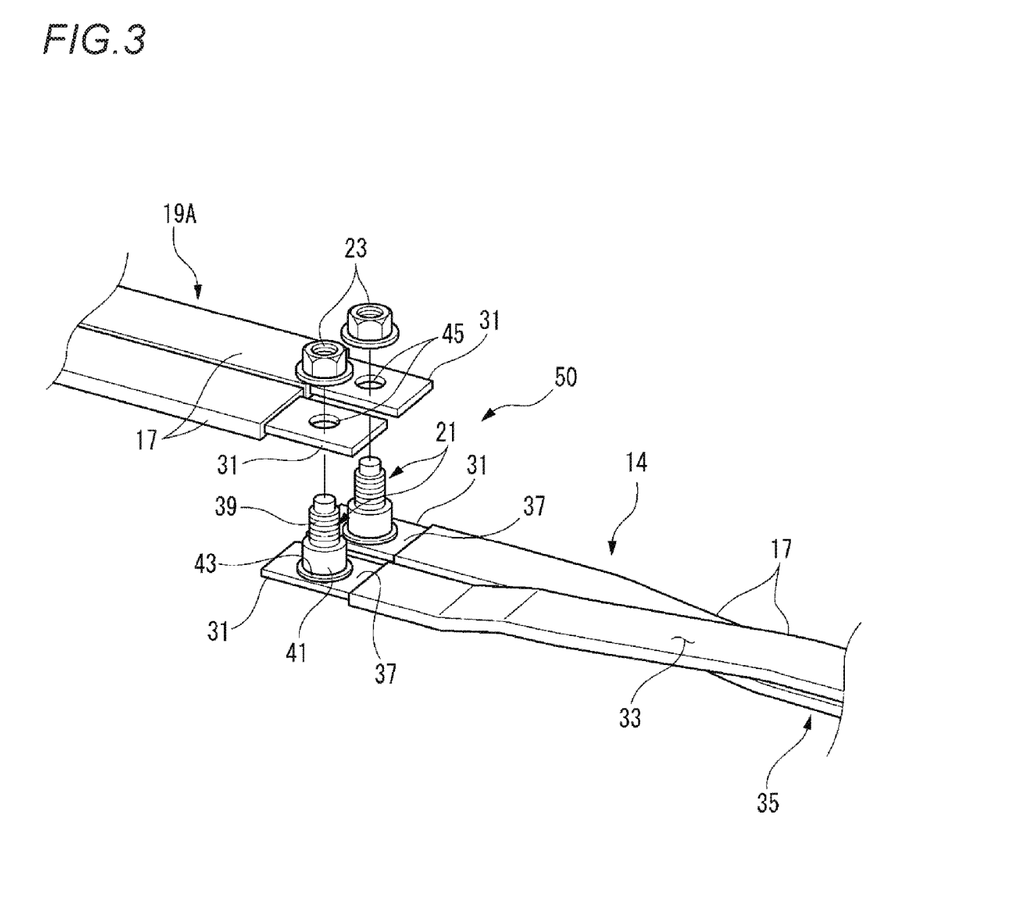
FIG. 3 is an exploded perspective view showing a modification of the main part in the wiring member connection structure shown in FIG. 2.

FIG. 3 is an exploded perspective view showing a modification of a main part in the wiring member connection structure shown in FIG. 2.

As shown in FIG. 3, counterpart wiring members 19A to be connected to the flat connectors 31 of the floor wire harness 14 according to the present embodiment may be flat wiring members 17. When the counterpart wiring members 19A are the flat wiring members 17, through holes 45 to be penetrated by the bolts 21 are directly formed in flat conductors 31 exposed at terminals of the counterpart wiring members 19A where coatings 33 have been removed. Also in this case, the nuts 23 are screwed on the bolts 21 that have been inserted through the through holes 45 at the terminals of the counterpart wiring members 19A. Since the nuts 23 are screwed on the bolts 21 that have been inserted through the through holes 45 of the flat conductors 31 in the counterpart wiring members 19A, the flat conductors 31 of the flat wiring members 17 are conductively connected directly to the flat conductors 31 of the counterpart wiring members 19A.

In the wiring member connection portion 13 in the present embodiment, the terminals of the flat wiring members 17 laminated in two layers are disposed in parallel on substantially one and the same plane. In the case of the flat wiring members 17 laminated in two layers, the respective flat wiring members 17 at a terminal of one laminated wiring body 35 are bent into a Y-shape in plan view to be disposed in parallel.

Figure 4:
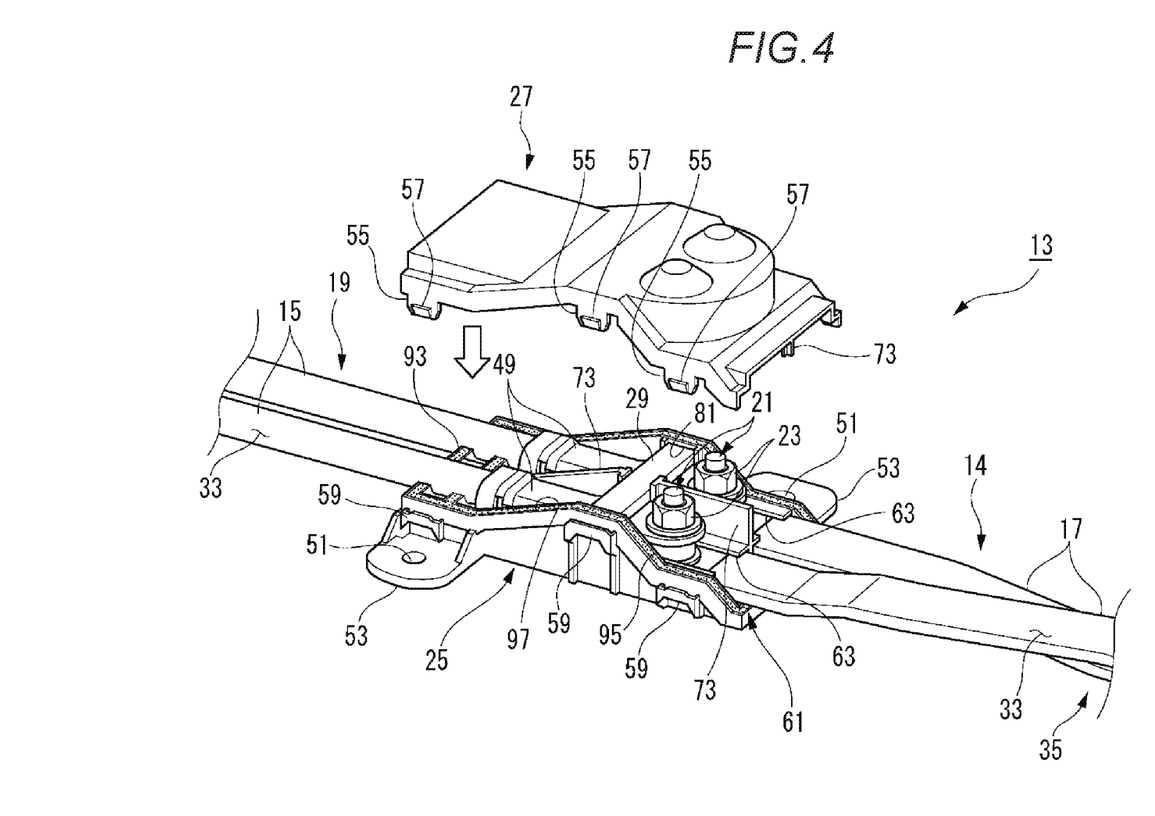
FIG. 4 is an exploded perspective view showing a state in which a cover in the wiring member connection structure shown in FIG. 1 has been opened.
Figure 5:
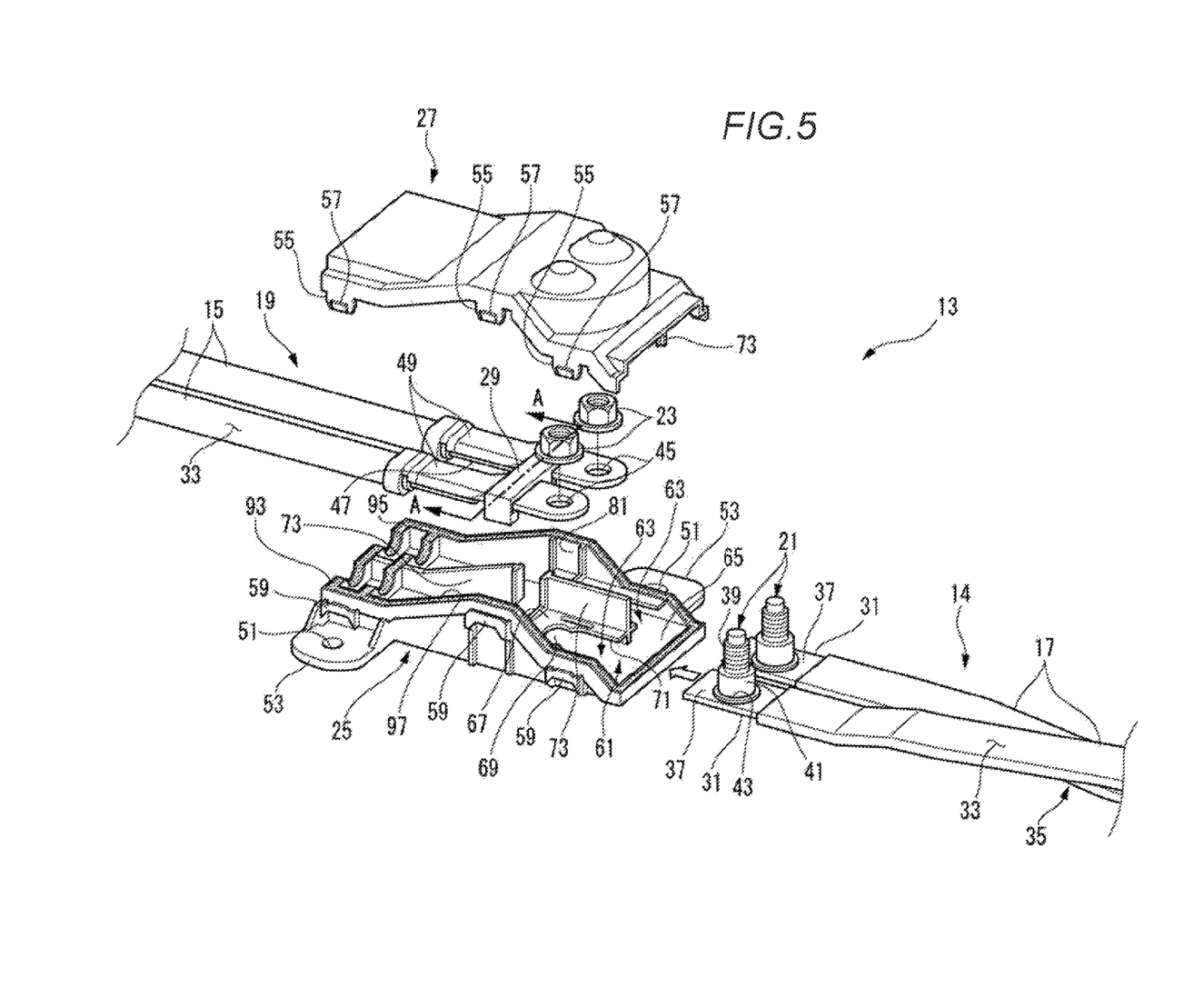
FIG. 5 is an exploded perspective view in which the wiring member connection structure shown in FIG. 4 has been further exploded.

FIG. 4 is an exploded perspective view showing a state in which the cover 27 in the wiring member connection structure shown in FIG. 1 has been opened. FIG. 5 is an exploded perspective view in which the wiring member connection structure shown in FIG. 4 has been further exploded.

In the wiring member connection portion 13 provided with the wiring member connection structure according to the present embodiment, the terminals of the flat wiring members 17 of the floor wire harness 14 and the terminals of the round electric wires 15 of the counterpart wiring members 19 fastened to each other respectively by the bolts 21 and the nuts 23 are covered with the casing 25 and the cover 27 assembled to the casing 25. The casing 25 receives the conductor flat surfaces 37 at the terminals of the flat wiring members 17 and the terminal pieces 49 at the terminals of the round electric wires 15. The cover 27 is put on the casing 25 to thereby cover both the conductor flat surfaces 37 at the terminals of the flat wiring members 17 and the terminal pieces 49 at the terminals of the round electric wires 15, the conductor flat surfaces 37 and the terminal pieces 49 being received in the casing 25. A plurality of fixation pieces 53 having fixation holes 51 are provided in the casing 25 so as to be fastened and fixed to the underbody 11.

As shown in FIG. 5, the cover 27 has a plurality of (e.g. six) elastic lock pieces 55 to be fixed to the casing 25. The elastic lock pieces 55 have lock claws 57 on their outer surfaces. The casing 25 has lock frame portions 59 provided at positions corresponding to the elastic lock pieces 55. The lock frame portions 59 float from side surfaces of the casing 25. When the cover 27 is fitted to the casing 25, the respective elastic lock pieces 55 enter the lock frame portions 59 to lock the lock claws 57 so that the cover 27 can be restrained from dropping out of the casing 25 (the cover 27 can be locked to the casing 25).

The casing 25 is formed substantially into a rectangular shape in plan view, as shown in FIG. 5. A flat wiring member retention portion 61 for retaining the flat wiring members 17 is formed on one longitudinal end side of the casing 25. The flat wiring member retention portion 61 has a pair of flat wiring member lock portions 63 for retaining the flat wiring members 17 individually and respectively.

A lock plate portion 67 floating by thickness of the flat conductor 31 from a bottom wall 65 of the casing 25 is formed in each of the flat wiring member lock portions 63. A flat conductor insertion space 69 is formed between the lock plate portion 67 and the bottom wall 65. A bolt insertion groove 71 is formed in the lock plate portion 67 so that the circular cylinder portion 41 of the bolt 21 can be inserted into the bolt insertion groove 71.

The wiring member connection portion 13 provided with the wiring member connection structure according to the present embodiment has a configuration in which the terminals of the flat wiring members 17 and the terminals of the counterpart wiring members 19 are disposed in parallel. Partition walls 73 for partitioning the adjacent terminals are formed in both the casing 25 and the cover 27. Incidentally, the partition walls 73 according to the present embodiment may be formed in at least one of the casing 25 and the cover 27.

Figure 6:
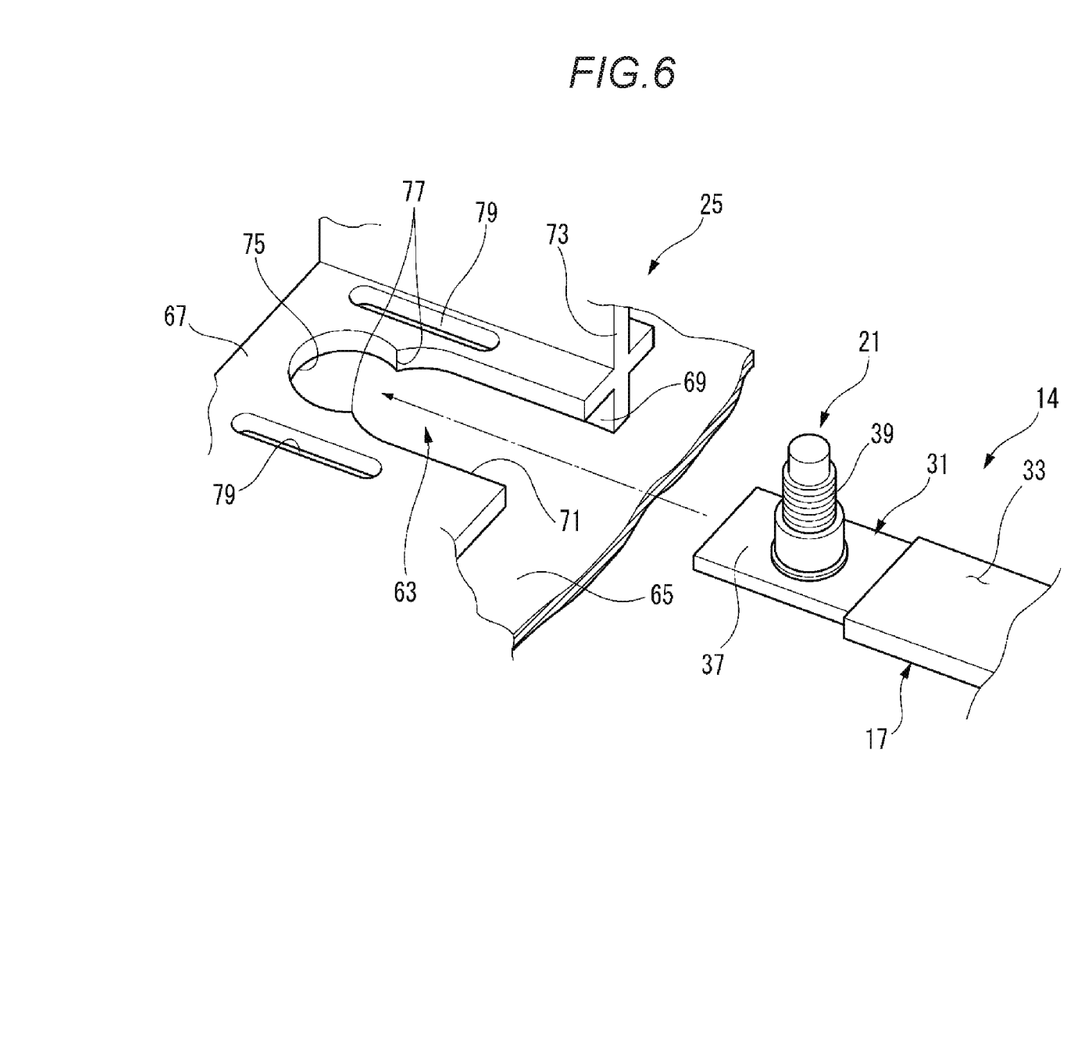
FIG. 6 is a main part enlarged view of a bolt retention portion shown in FIG. 5.

FIG. 6 is an enlarged view of each of bolt retention portions 75 shown in FIG. 5.

As shown in FIG. 6, neck portions 77 for retaining the circular cylinder portion 41 of the bolt 21 are formed on a deep side of the bolt insertion groove 71 of the casing 25 in an insertion-direction. The bolt retention portion 75 is located on a deeper side than the neck portions 77. Further, a pair of parallel slits 79 are formed on outer sides of the opposite neck portions 77 in the lock plate portion 67. Since the slits 79 are formed adjacently, the neck portions 77 function as opposite end supporting elastic lock beams. That is, when the flat conductor 31 of the flat wiring member 17 of the floor wire harness 14 is inserted into the flat conductor insertion space 69, the circular cylinder portion 41 of the bolt 21 elastically deforms and expands the left and right neck portions 77 so that the circular portion 41 of the bolt 21 can pass through the neck portions 77. As a result, the circular cylinder portion 41 is restrained from dropping out of the bolt retention portion 75 by the elastically restored neck portions 77.

On the other hand, as shown in FIG. 5, the counterpart wiring members 19 are preassembled in such a manner that the pair of the terminals of the counterpart wiring members 19 are lined up by the guide member 29. Guide fixation portions 81 for retaining the guide member 29 are formed in inner wall surfaces of the casing 25. The guide fixation portions 81 can be formed, for example, into square recesses into which side surfaces of the guide member 29 are fitted. By the guide member 29 by which the two counterpart wiring members 19 have been preassembled, the terminals of the two counterpart wiring members 19 are disposed in accordance with an interval between the flat wiring members 17 disposed in parallel.

That is, in the wiring member connection portion 13 provided with the wiring member connection structure according to the present embodiment, the through holes 45 provided in the respective terminal pieces 49 of the two counterpart wiring members 19 retained by the guide member 29 are penetrated by the respective bolts 21 of the two flat wiring members 17 retained in the casing 25. Thus, the through holes 45 of the counterpart wiring members 19 can be penetrated by the bolts 21 in a lump. Due to the nuts 23 screwed on the bolts 21, the terminal pieces 49 in which the bolts 21 have been inserted through the through holes 45 are conductively connected to the flat conductors 31.

Figure 7A:
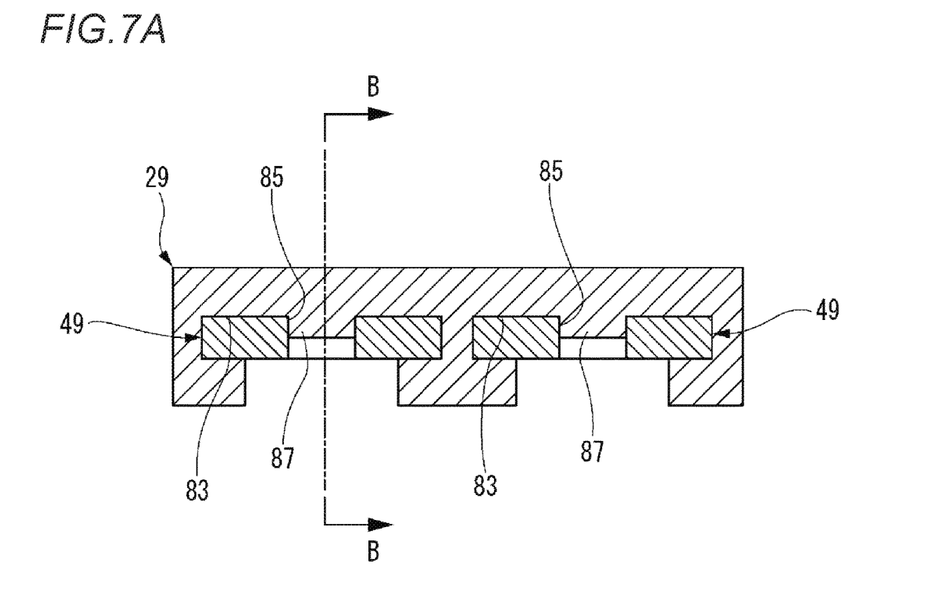
FIG. 7A is a sectional view taken along a line A-A of FIG. 5.
Figure 7B:
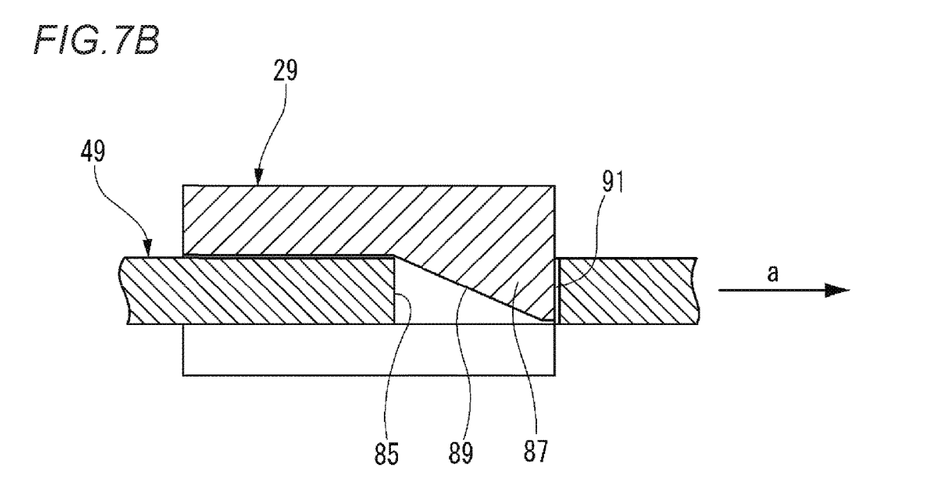
FIG. 7B is a sectional view taken along a line B-B of FIG. 7A.

FIG. 7A is a sectional view taken along a line A-A in FIG. 5. FIG. 7B is a sectional view taken along a line B-B in FIG. 7A.

The guide member 29 is formed substantially into a rectangular parallelepiped and made of an electrically insulating resin material. As shown in FIG. 7A, a plurality of (two in the present embodiment) terminal piece insertion grooves 83 penetrating in a direction perpendicular to the longitudinal direction are formed in the guide member 29 to be arranged in parallel in the longitudinal direction. Lock holes 85 are bored at the rear of the through holes 45 in the insertion direction in the terminal pieces 49 (see FIG. 2). In the guide member 29, terminal piece lock protrusions 87 to be locked in the lock holes 85 of the terminal pieces 49 are formed in the bottoms of the terminal piece insertion grooves 83 respectively.

Each of the terminal piece lock protrusions 87 has a slope 89 that enters the lock hole 85 gradually deeply in the insertion direction (an arrow a direction in FIG. 7B) of the terminal piece 49. A front end side of the terminal piece lock protrusion 87 in the insertion direction of the terminal piece 49 is a lock surface 91. When the lock hole 85 abuts against the lock surface 91 of the terminal piece lock protrusion 87, the terminal piece 49 which has been inserted into the terminal piece insertion groove 83 is restrained from dropping out from the rear side (dropping out of an opposite side to the insertion direction).

The casing 25 can be used to form the wiring member connection portion 13 into a waterproof structure as follows. That is, a sealant retention groove 95 is formed in each of mating faces 93 (edges) of the casing 25 and the cover 27, and filled with a sealant 97 of a rubber packing, foamed rubber urethane, etc. The sealant retention groove 95 may be formed in any one of the casing 25 and the cover 27. In this case, an edge of the other of the casing 25 and the cover 27 abuts against the sealant 97. Thus, when the cover 27 is fitted to the casing 25, the structure can be formed so that the sealant 97 is squashed to prevent water from entering the casing.

Incidentally, it is desirable that the structure is formed in such a manner that a large number of the aforementioned elastic lock pieces 55 and a large number of the aforementioned lock frame portions 59 provided in the casing 25 and the cover 27 are provided to a possible extent so that the sealant 97 can be squashed by equivalent pressure in order to be waterproof.

Next, an assembling procedure of the wiring member connection portion 13 provided with the wiring member connection structure according to the present embodiment will be described.

In the wiring member connection portion 13 according to the present embodiment, first, the pair of flat wiring members 17 will be temporarily fixed to the casing 25 as follows. The terminals of the flat wiring members 17 to which the bolts 21 have been bonded are inserted into the flat conductor insertion spaces 69 of the casing 25 respectively. When the bolts 21 pass through the neck portions 77 to reach the bolt retention portions 75, the flat wiring members 17 that have been inserted into the flat conductor insertion spaces 69 are temporarily fixed. The respective bolts 21 rises from the bottom wall 65 in the state in which the pair of flat wiring members 17 have been temporarily fixed to the casing 25.

Next, the pair of preassembled counterpart wiring members 19 will be attached to the casing 25 as follows. The counterpart wiring members 19 are preassembled in such a manner that the terminal pieces 49 of the counterpart wiring members 19 are inserted into the terminal piece insertion grooves 83 of the guide member 29 respectively. The pair of counterpart wiring members 19 preassembled by the guide member 29 to be thereby lined up with interposition of a predetermined interval therebetween can be penetrated in a lump by the bolts 21. When the guide member 29 is fixed to the guide fixation portions 81 of the casing 25, the counterpart wiring members 19 in which the terminal pieces 49 have been penetrated by the bolts 21 are temporarily fixed to the casing 25 completely.

The nuts 23 are screwed on the external thread portions 39 of the bolts 21 that have been inserted through the terminal pieces 49 respectively. Thus, the conductors in the flat wiring members 17 and the counterpart wiring members 19 are conductively connected to each other respectively so that the flat wiring members 17 and the counterpart wiring members 19 are permanently fixed. Finally, the cover 27 is mounted on the casing 25. Since the cover 27 is mounted on the casing 25, the elastic lock pieces 55 are locked into the lock frame portions 59 of the casing 25. Thus, the casing 25 and the cover 27 cover the conductors in the flat wiring members 17 and the counterpart wiring members 19 which have been permanently fixed so that the casing 25 and the cover 27 are locked integrally with each other. As a result, assembling of the wiring member connection portion 13 into the waterproof structure is completed.

Next, effects of the aforementioned configuration will be described.

In the wiring member connection portion 13 provided with the wiring member connection structure according to the present embodiment, the flat wiring members 17 are conductively connected to the counterpart wiring members 19. The bolts 21 are erect and bonded to the one conductor flat surfaces 37 of the flat conductors 31 exposed at the terminals of the flat wiring members 17 where the coatings 33 have been removed. That is, the flat wiring members 17 serve as bolt-including electric wires in which the bolts 21 have been conductively fixed to the terminals. On the other hand, the through holes 45 are provided in the conductors 47 at the terminals of the counterpart wiring members 19 connected to the flat wiring members 17. Since the counterpart wiring members 19 are the round electric wires 15, the through holes 45 according to the present embodiment are provided as through holes 45 formed in the terminal pieces 49 that are connected to the conductors 47 at the terminals of the counterpart wiring members 19.

In the flat wiring members 17 and the counterpart wiring members 19 configured thus, the bolts 21 bonded to the conductor flat surfaces 37 of the flat conductors 31 are inserted through the through holes 45 and fastened to the nuts 23. The through holes 45 are formed in the terminal pieces 49 connected to the conductors 47 at the terminals of the counterpart wiring members 19. Thus, the connectors in the flat wiring members 17 and the counterpart wiring members 19 configured thus are conductively connected directly to each other respectively.

As a result, the wiring member connection structure according to the present embodiment does not require any connector or any electric connection box but can suppress a mounting space on the vehicle. In addition, the conductors are directly fixed to each other respectively by the bolts 21 and the nuts 23. Accordingly, the wiring member connection structure according to the present embodiment can obtain connection with higher strength than a connector connection structure.

In the background art, it is typical that thick round electric wires are used in a vehicle power supply circuit. When, for example, the thick round electric wires are arranged in parallel and routed, the thick round electric wires are arranged side by side in a diameter direction of a circular section thereof. A pair of substantially triangular gaps interposed between circular arcs of outer circumferences of adjacent ones of the electric wires are generated between the electric wires. Each of the gaps becomes a wasteful space to thereby lower electric wire routing density. It is therefore necessary to secure a larger wiring space. In addition, a clamp component with a complicated structure is necessary when the thick round electric wires are arranged in parallel and fixed to a vehicle body.

On the other hand, in the wiring member connection structure according to the present embodiment, at least ones of the wiring members to be connected are the flat wiring members 17. Each of the flat wiring members 17 has the flat conductor 31 shaped like a thin rectangle. The outer circumference of the flat conductor 31 is covered with the coating 33. When the flat wiring members 17 serve as a plurality of circuits, the circuits can be laminated in a thickness direction. The number of the circuits of the flat wiring members 17 can be increased by slightly increasing the thickness without changing the width. In this case, the thin rectangular shapes are laminated to one another. Accordingly, wiring with high density can be attained without generating any gap between the wiring members. When the flat wiring members 17 formed as the laminated wiring body 35 are fixed to the vehicle body, the sectional shape of the flat wiring members 17 is rectangular so that a clamp component with a simple structure can be used.

In the wiring member connection structure according to the present embodiment, even in the case of the laminated wiring body 35 in which the two flat wiring members 17 are laminated to each other, the respective flat wiring members 17 at the terminal of the laminated wiring body 35 are arranged side by side on substantially one and the same plane. Accordingly, connection work for fastening the bolts 21 to the nuts 23 can be made easy.

In addition, in the wiring member connection structure according to the present embodiment, the terminals of the flat wiring members 17 and the terminals of the counterpart wiring members 19 from which the coatings 33 have been removed and which have been fastened to each other respectively by the bolts are covered with the casing 25 and the cover 27. Therefore, the conductor connection portions 50 between the flat wiring members 17 and the counterpart wiring members 19 can be insulated in a lump. In addition, the wiring member connection portion 13 can be formed to have a simple structure in which the conductors are directly fastened by the bolts 21 and the nuts 23. Accordingly, external dimensions of an assembly of the casing 25 and the cover 27 can be formed, for example, with a more compact size measuring about 120 mm long by about 60 mm wide by about 40 mm high, than a background-art connector connection structure. Incidentally, when the background-art connector connection structure has the same number of electric wires as the wiring member connection portion 13, the background-art connector connection structure is formed with a size measuring, for example, about 250 mm long by about 100 mm wide by about 70 mm high. As a result, the wiring member connection portion 13 according to the present embodiment is smaller in size than the background-art connector connection structure. Accordingly, the wiring member connection portion 13 can be mounted in a narrower vehicle space. In addition thereto, the wiring member connection structure according to the present embodiment has higher connection strength than the connector connection structure. Therefore, the wiring member connection structure according to the present embodiment can obtain an effect of being hardly disconnected when strong force is applied to the wiring member connection portion 13 due to a vehicle accident etc.

In the wiring member connection portion 13 according to the present embodiment, portions where the conductors are exposed are covered with the casing 25 and the cover 27. Accordingly, the conductors can be protected from being electrically conducted due to their contact with any peripheral components and from being disconnected. In addition, the fixation pieces 53 to be fastened and fixed to the underbody 11 are provided in the casing 25. Thus, the wiring member connection portion 13 can be directly fixed to the underbody 11. Thus, insulation and fixation of the wiring member connection portion 13 can be performed simultaneously so that assembling workability can be enhanced.

In addition, in the wiring member connection portion 13 according to the present embodiment, shirt-circuiting between the conductors of the flat wiring members 17 and the conductors of the counterpart wiring members 19 arranged side by side on substantially one and the same plane inside the casing 25 and the cover 27 can be prevented by the partition walls 73 formed in the casing 25 and the cover 27. That is, even when the plurality of flat wiring members 17 to be connected by bolts are provided, contact (shirt-circuiting) between the conductors inside the casing 25 and the cover 27 can be prevented. Accordingly, it is unnecessary to apply insulating treatment to the adjacent conductor connection portions 50 respectively but it is possible to simultaneously insulate the adjacent conductor connection portions 50 by simple work of only assembling the adjacent conductor connection portions 50 into the casing 25 and the cover 27.

Further, in the wiring member connection structure according to the present embodiment, the two counterpart wiring members 19 lined up integrally by the guide member 29 can be assembled in a lump into the casing 25 in which the flat wiring members 17 already have been assembled. The two counterpart wiring members 19 are mounted on the guide member 29 respectively to be thereby positioned relatively to each other. That is, the two counterpart wiring members 19 are mounted on the guide member 29 so that all the round electric wires 15 can be positioned in accordance with the attachment positions (attachment positions) of the flat wiring members 17 and preassembled. The guide member 29 is, for example, mounted in the guide fixation portions 81 formed in the casing 25. The guide fixation portions 81 are provided at the positions where the terminals of the counterpart wiring members 19 retained by the mounted guide member 29 can be made in line with the terminals of the flat wiring members 17 that have been attached to the casing 25. Accordingly, in the wiring member connection portion 13 provided with the wiring member connection structure according to the present embodiment, the through holes 45 provided at the terminals of the two counterpart wiring members 19 preassembled by the guide member 29 are penetrated in a lump by the bolts 21 provided respectively on the terminals of the two flat wiring members 17.

Accordingly, according to the aforementioned wiring member connection structure according to the present embodiment, it can be mounted on the vehicle in a smaller space and can be configured with higher connection strength than a connector connection structure.

The present invention is not limited to the aforementioned embodiment. Combination of the constituents of the embodiment with one another or changes or applications performed by those skilled in the art based on the description of the present invention and the well-known technique are also intended by the present invention and included in the protection scope the present invention seeks.

Here, the aforementioned characteristics of the wiring member connection structure according to the embodiment of the present invention will be briefly summarized and listed respectively in the following items [1] to [5].

[1] A wiring member connection structure including:

one or more flat wiring members (17) formed by covering an outer circumference of a belt-like flat conductor (31) with an insulating coating (33);

one or more bolts (21) that are erect and bonded perpendicularly to one conductor flat surfaces (37) of the flat conductors exposed at terminals of the flat wiring members where the coatings have been removed;

one or more counterpart wiring members (19) in each of which a through hole (45) to be penetrated by the bolt is provided at a terminal of a conductor (47); and one or more nuts (23) that are screwed on the bolts inserted through the through holes to thereby conductively connect the flat conductors of the flat wiring members directly to the conductors of the counterpart wiring members.

[2] The wiring member connection structure according to the aforementioned item [1], wherein:

the respective terminals of the flat wiring members (17) laminated to one another are disposed in parallel on substantially one and the same plane.

[3] The wiring member connection structure according to the aforementioned item [1] or [2], wherein:

the terminals of the flat wiring members (17) and the terminals of the counterpart wiring members (19) fastened to each other respectively by the bolts (21) and the nuts (23) are covered with a casing (25) and a cover (27) assembled to the casing.

[4] The wiring member connection structure according to the aforementioned item [3], wherein:

in a case that the wiring member connection structure has a configuration in which the terminals are disposed in parallel, a partition wall (73) for preventing short-circuiting between the terminals adjacent to each other is formed in at least one of the casing (25) and the cover (27).

[5] The wiring member connection structure according to the aforementioned item [4], wherein:

the terminals of the counterpart wiring members (19) are lined up by a guide member (29) in accordance with the respective terminals of the flat wiring members (17) disposed in parallel.

What is claimed is:

1. A wiring member connection structure comprising:
   a first flat wiring member formed by covering an outer circumference of a first belt-like flat conductor with an insulating coating;
   a second flat wiring member formed by covering an outer circumference of a second belt-like flat conductor with the insulating coating;
   a first bolt that is erect and bonded perpendicularly to one conductor flat surface of the first belt-like flat conductor exposed at a first terminal of the first flat wiring member where the insulating coating is removed;
   a second bolt that is erect and bonded perpendicularly to another conductor flat surface of the second belt-like flat conductor exposed at a second terminal of the second flat wiring member where the insulating coating is removed;
   a first counterpart wiring member in which a first through hole is provided at a terminal of a first conductor so as to pass the first bolt;
   a second counterpart wiring member in which a second through hole is provided at a terminal of a second conductor so as to pass the second bolt;
   a first nut that is screwed on the first bolt inserted through the first through hole to thereby conductively connect the first belt-like flat conductor of the first flat wiring member directly to the first conductor of the first counterpart wiring member; and
   a second nut that is screwed on the second bolt inserted through the second through hole to thereby conductively connect the second belt-like flat conductor of the first flat wiring member directly to the second conductor of the second counterpart wiring member,
   wherein the first flat wiring member and the second flat wiring member are laminated to each other forming a laminated wiring body including portions of the first flat wiring member and the second flat wiring members distal to the one conductor flat surface of the first flat wiring member and the other conductor flat surface of the second flat wiring member,
   wherein the first flat wiring member and the second flat wiring member at a terminal of the laminated wiring body are bent into a Y-shape to be disposed in parallel, and
   wherein the first terminal of the first flat wiring member and the second terminal of the second flat wiring member are disposed in parallel on substantially one and the same plane.

2. The wiring member connection structure according to claim 1, wherein the first and second terminals of the first and second flat wiring members and the first and second terminals of the first and second counterpart wiring member fastened to each other respectively by the first bolt and the first nut and the second bolt and the second nut are each covered with a casing and a cover assembled to the casing.

3. The wiring member connection structure according to claim 2, further comprising:
   a partition wall for preventing short-circuiting disposed between the first and second terminals adjacent to each other is formed in at least one of the casing and the cover.

4. The wiring member connection structure according to claim 3, wherein the terminals of the first and second conductors are lined up by a guide member in accordance with the respective first and second terminals of the first and second flat wiring members.

* * * * *